No. 686,785. Patented Nov. 19, 1901.
J. J. UNBEHEND.
MUD GUARD FOR VEHICLE TIRES.
(Application filed Mar. 2, 1901.)

(No Model.)

WITNESSES:

INVENTOR
Jacob J. Unbehend
By E. Laass
ATTORNEY.

UNITED STATES PATENT OFFICE.

JACOB J. UNBEHEND, OF SYRACUSE, NEW YORK.

MUD-GUARD FOR VEHICLE-TIRES.

SPECIFICATION forming part of Letters Patent No. 686,785, dated November 19, 1901.

Application filed March 2, 1901. Serial No. 49,584. (No model.)

*To all whom it may concern:*

Be it known that I, JACOB J. UNBEHEND, a citizen of the United States, and a resident of Syracuse, in the county of Onondaga, in the State of New York, have invented new and useful Improvements in Mud-Guards for Vehicle-Wheels, of which the following, taken in connection with the accompanying drawings, is a full, clear, and exact description.

The salient features of my invention reside in the cylindrical form and inflexibility of the roller, which is held in contact with the periphery of the wheel to cast the mud and water therefrom while the bicycle is in motion. The object of the cylindrical shape of said roller is to prevent excessive frictional contact with the wheel and also guard against packing and clogging of mud on the end portions of the periphery of the roller.

My invention also consists in novel means for supporting the aforesaid roller and its shield on the bicycle, as hereinafter more fully described.

Figure 1:
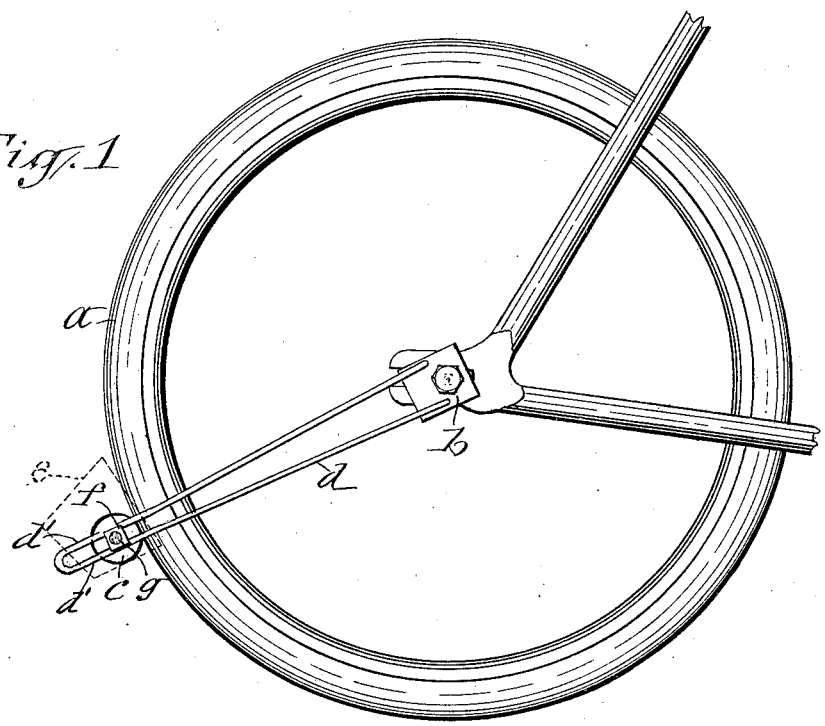
Figure 2:
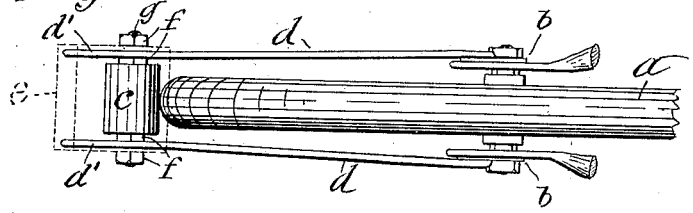
Figure 3:
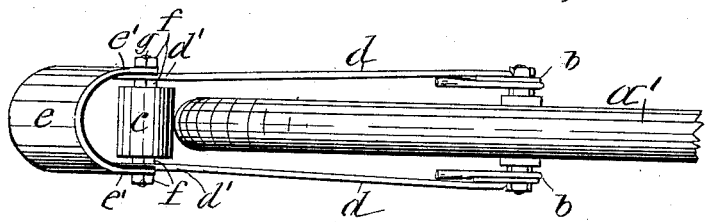

In the annexed drawings, Figure 1 is a side view of the rear wheel of a bicycle equipped with my improved mud-guard. Fig. 2 is a top view of the portion of said wheel to which the mud-guard is connected, and Fig. 3 is a top view of the mud-guard applied to the front wheel of the bicycle.

Similar letters of reference indicate corresponding parts.

$a$ and $a'$ represent, respectively, the rear and front wheels of a bicycle.

$c$ denotes the mud-guard, which consists of a roller formed cylindrical and inflexible to retain its said form for the purpose hereinbefore explained. To sustain said roller in contact with the periphery of the wheel, I attach to opposite sides of the frame two plates $b$, preferably clamped on the protruding ends of the axle of the wheel. Each of these plates is provided with two perforations near its top and bottom edges for attaching thereto one of the pair of arms $d\ d$, which carry on their free ends the roller $c$. Each of these arms I form of a rod bent at the center of its length to dispose the adjacent central portions $d'$ thereof parallel to each other and to extend thence divergently to the two perforations of one of the plates $b$, through which the ends of the rod pass and are fastened to the plate.

Transversely through said parallel portion $d'$ of the rods $d\ d$ passes a shaft $g$, on which is pivotally supported the roller $c$, disposed between the arms. The end portions of the shaft $g$ are screw-threaded and provided with nuts $f$ at the inner and outer sides of the arms, by means of which nuts the said shaft is clamped on the arms. The parallel portions $d'$ of said arms allow the roller-shaft to be shifted longitudinally on the arms to accommodate the roller to the diameter of the wheel. The purpose of the divergence of the main portions of the arms $d\ d$ is to brace them and to also obviate vibration and rattling of said arms. The cylindrical shape of the roller reduces to a minimum its contact with the wheel and leaves the end portions of the roller clear of the wheel, so as to guard against the liability of accumulation and clogging of mud between the roller and wheel. The frictional contact of the roller $c$ with the wheel causes said roller to partake of rapid rotary motion in opposite direction from the wheel, and by said motion the water and mud are cast from the roller.

To protect the rider of the bicycle from the mud or water cast from the aforesaid roller, I employ a shield $e$, which is separate from the roller and sustained over the rear and upper portion of the roller and out of contact therewith by means of end extensions $e'$, clamped on the exteriors of the arms $d$ by means of nuts on the outer ends of the shaft $g$. Said shield is disposed at an angle to direct the mud from the roller to the ground in vicinity to the wheel, and thus protect the rider from said mud.

What I claim as my invention is—

1. The combination, with a bicycle, of arms extending from the frame to the periphery of the wheel, an inflexible roller of cylindrical form pivotally supported on said arms and held thereby in contact with the periphery of the wheel, and a shield secured to said arms and disposed in proximity to and out of contact with the top of the aforesaid roller as set forth.

2. The combination with a bicycle, of plates fastened to opposite sides of the frame, two rods, each bent at the center of its length to dispose the adjacent central portions parallel to each other and extending thence divergent to one of the aforesaid plates and fastened thereto, a shaft extending transversely through the parallel portions of said rods and adjustably clamped therein, and a roller mounted on said shaft and sustained in contact with the periphery of the bicycle-wheel as set forth.

3. The combination with a bicycle, of plates fastened to opposite sides of the frame, two rods, each bent at the center of its length to dispose the adjacent central portions parallel to each other and extending thence divergent to one of the aforesaid plates and fastened thereto, a shaft extending transversely through the parallel portions of said rods and clamped therein, and a roller mounted on said shaft and formed cylindrical and inflexible to retain its form as set forth.

4. The combination with a bicycle, of plates fastened to opposite sides of the frame, two rods, each bent at the center of its length to dispose the adjacent central portions parallel to each other and extending thence divergent to one of the aforesaid plates and fastened thereto, a shaft extending transversely through the parallel portions of the rods and clamped therein, a roller mounted on said shaft and formed cylindrical and inflexible to retain its said form, and a shield fastened to the aforesaid rods and disposed over the rear and upper portion of the said roller and out of contact therewith as set forth.

JACOB J. UNBEHEND.

Witnesses:
J. J. LAASS,
WM. HAWLEY.